June 3, 1930.  P. D. SMITH  1,760,919
TRACTOR HITCH FOR ROAD MACHINES
Filed March 15, 1928  2 Sheets-Sheet 2

Inventor
Paul D. Smith
By his Attorneys
Merchant and Kilgore

Patented June 3, 1930

1,760,919

UNITED STATES PATENT OFFICE

PAUL D. SMITH, OF MINNEAPOLIS, MINNESOTA, ASSIGNOR TO STOCKLAND ROAD MACHINERY COMPANY, OF MINNEAPOLIS, MINNESOTA, A CORPORATION OF MINNESOTA

TRACTOR HITCH FOR ROAD MACHINES

Application filed March 15, 1928. Serial No. 261,799.

My present invention relates to a one-man control tractor and road machine for road grading, maintenance and other work, and more particularly to an improved hitch for closely coupling the road machine to the tractor so as to follow the same, as disclosed and broadly claimed in my co-pending application entitled "Road machine," Serial Number 237,416, filed December 3, 1927.

It has been found that in attaching a road machine to a tractor, both of which have front wheels mounted for angular steering movements by means of a hitch having a connection with a vertical pivot, that said hitch, under certain conditions, will jackknife when backing or turning the road machine thus causing annoyance and delay during the operation of the road machine.

The object of my present invention is to provide a hitch that will hold the front wheels of a road machine against angular steering movements in respect to the tractor but at the same time permit independent angular or rocking movements of the tractor and road machine in respect to each other as well in both longitudinal and transverse vertical planes. By thus attaching the road machine to follow the tractor, the front wheel of the road machine will be skidded by the tractor during the turning movements, which, in actual usage, has been found to be relatively slight and not objectionable.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 2 is a fragmentary perspective view of the tractor drawbar and its support;

Fig. 3 is a side view of the parts shown in Fig. 2 and further illustrating the hitch;

Fig. 4 is a perspective view of the improved hitch; and

Fig. 5 is a fragmentary detail view partly in plan and partly in section showing the connection between the brace and one of the bars of the hitch.

Figure 1:
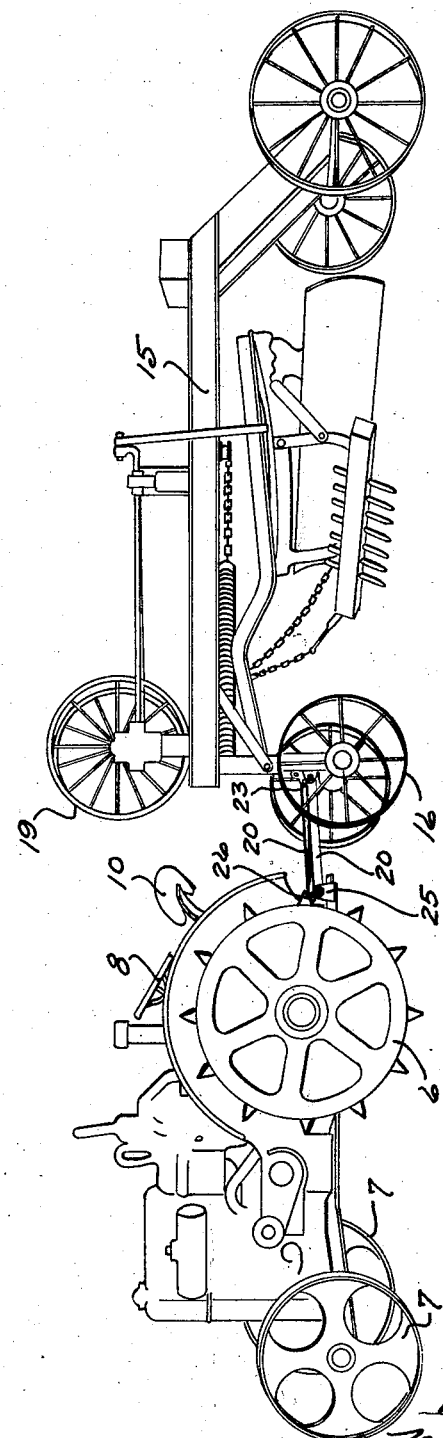
Fig. 1 is a perspective view of a tractor and road machine connected by the improved hitch.

Of the parts of the tractor illustrated it is important to note its rear wheel 6, front wheels 7 which are mounted for angular steering movements, steering wheel 8 for said front wheels, rear platform 9, seat 10, rearwardly extended drawbar 11 having near its outer end a hole 12 and which bar is mounted for horizontal swinging movement between a pair of transversely extended bars 13 which form a part of the drawbar support 14.

The road machine 15, as illustrated, is of the four-wheel type and its front wheels 16 are journaled on a front axle structure 17 which is pivoted at 18 to the frame structure of said machine for imparting angular steering movements to the front wheels 16. The hand wheels 19 for the control of the road-working mechanism of the road machine 15 are located at the front of said machine.

The improved hitch comprises a pair of laterally spaced bars 20 set vertically edgewise and connected by an oblique brace 21. Said hitch is attached to the front axle structure 17 of the road machine 15 against lateral swinging movements transversely of said machine but with freedom for vertical swinging movement by having its rear end portions inserted between pairs of laterally spaced lugs 22 on the front axle structure 17 and attached thereto by pivot bolts 23 which are horizontally aligned transversely of the road machine 15.

The hitch is attached to the tractor by a yoke 24 which extends transversely thereof and has at its ends upstanding laterally spaced lugs 25 between which the front end portions of the bars 20 20 extend and are attached thereto by a pair of pivot bolts 26 which are horizontally aligned transversely of the tractor. These lugs 25 and pivot bolts 26 hold the bars 20 against horizontal swinging movements transversely of the tractor but at the same time permit vertical swinging movements of said bars.

The pivotal connections between the bars 20 and lugs 22 and 25 are such as to permit independent vertical swinging movements of said bars and hence independent angular or rocking movements of the tractor and road machine in a longitudinal vertical plane. These pivotal connections between the bars 20 and lugs 22 and 25 have sufficient play to permit independent angular or rocking movements of the tractor and road machine in transverse vertical planes. The brace bar 21 is attached at its ends to the bars 20 by shouldered bolts 27 that permit independent vertical swinging movements of the two bars 20 and with sufficient play to permit slight independent transverse angular movements of said bars.

From the above description it is evident that the hitch, while permitting free independent angular rocking movements of tractor and road machine in both longitudinal and transverse vertical planes, securely holds the front axle structure 17 and hence the wheels 16 journaled thereon against angular steering movements in respect to the tractor.

The yoke 24 is detachably applied to the drawbar 11 by having a passage 28 through which said bar extends and a nut-equipped bolt 29 inserted through aligned holes in said yoke and drawbar. Said bolt 29 holds the yoke 24 closely positioned against the rear edges of the bars 13 and said yoke is provided with a pair of lugs 30 which extend between said bars 13, one on each side of the drawbar 11 and assist in supporting said yoke. The drawbar 11 is held against swinging movement in respect to its support by a nut-equipped bolt 31 which extends through aligned holes in the bars 13 and drawbar 11.

The bars 20 of the hitch are relatively short and hold the tractor and road machine closely coupled so that an operator on the seat 10 may easily operate the tractor and road machine. It will be noted that the seat 10 is set at an angle transversely of the tractor so that the operator is in a position in which he can easily control said tractor and road machine. The wheels 16 of the road machine are relatively wide so that they skid very easily during turning movements imparted to the road machine by the tractor.

What I claim is:

1. The combination with a tractor having front and rear wheels, the former of which are mounted for angular steering movements, said tractor also having a rearwardly projecting drawbar and a support therefor including a pair of transverse bars between which the drawbar projects, of a road machine having front and rear wheels and a front axle structure on which the front wheels of the road machine are journaled, said front axle structure being pivoted to the road machine for imparting angular steering movements to the front wheels journaled thereon, and a hitch rigidly connecting the front axle structure to the tractor and holding the same against angular steering movements in respect thereto, said hitch comprising a yoke applied to the drawbar and a pair of laterally spaced bars attached by horizontal pivots to the yoke and front axle structure of the road machine, said drawbar and yoke being held against movement transversely of the tractor, said pivots permitting independent vertical transverse angular movements of the tractor and road machine in respect to each other and a brace connecting the bars of said pair with freedom to permit the above movements thereof.

2. The structure defined in claim 1 in which the yoke directly engages the drawbar support and is provided with a pair of lugs extending between the transverse bars of said support.

3. The combination with a tractor, of a vehicle having a front wheel mounted for angular steering movements, and a hitch connecting the vehicle to the tractor, holding said front wheel against said angular steering movements and permitting free independent vertical movements of the tractor and vehicle in respect to each other, whereby said front wheel will be skidded by the tractor during its turning movements.

4. The combination with a tractor, of a vehicle having a front axle pivoted for angular steering movements, and front and rear wheels, the former of which are journaled on said axle and held for common steering movements therewith, and a hitch connecting said pivoted front axle to the tractor, holding the same against angular steering movements in respect thereto and permitting free independent vertical movements of the tractor and vehicle in respect to each other.

5. The combination of a tractor, of a vehicle having a front axle pivoted for angular steering movements, and front and rear wheels, the former of which are journaled on said axle and hold for common steering movements therewith, and a hitch connecting said pivoted front axle to the tractor, holding the same against angular steering movements in respect thereto and permitting free independent vertical movements of the tractor and vehicle in respect to each other.

6. The combination of a tractor having a rearwardly projecting draw bar and a support therefor having a horizontally extended passage through which the draw bar projects with freedom for horizontal swinging movements, of a vehicle having a front axle pivoted for angular steering movements, and front and rear wheels, the former of which are journaled on said axle, a hitch comprising a pair of laterally spaced horizontally extended bars, the rear ends of which are attached to the front axle by horizontal pivots, a cross-tie bar to which the front ends of the bars are attached by horizontal pivots, and a coupling connecting the cross-tie bar to the draw bar and holding said cross-tie bar in contact with the draw bar support to prevent horizontal swinging movements of the draw bar, said hitch holding the front axle of the vehicle against angular steering movements in respect to the tractor and permitting free vertical movements of the tractor and vehicle in respect to each other.

In testimony whereof I affix my signature.

PAUL D. SMITH.